United States Patent [19]

Luther

[11] 4,044,669
[45] Aug. 30, 1977

[54] ROTARY SCREEN MOUNTING DEVICE

[75] Inventor: Harald Johan Luther, Alingsas, Sweden

[73] Assignee: Almedahls Aktiebolag, Alingsas, Sweden

[21] Appl. No.: 582,434

[22] Filed: May 30, 1975

[30] Foreign Application Priority Data

May 30, 1974  Sweden ................................ 7407201

[51] Int. Cl.² ................................................ B41F 15/38
[52] U.S. Cl. .................................... 101/127.1; 29/117
[58] Field of Search ............... 101/115, 116, 122, 127, 101/127.1, 128.1, 415.1; 29/113 R, 117, 119; 198/202; 209/404–407

[56] References Cited

U.S. PATENT DOCUMENTS

| | | | |
|---|---|---|---|
| 2,235,730 | 3/1941 | Simonds | 29/117 X |
| 2,890,517 | 6/1959 | Mengel | 29/117 X |
| 2,965,025 | 12/1960 | Mueller | 101/415.1 |
| 3,176,843 | 4/1965 | Hoskins et al. | 101/127.1 X |
| 3,702,098 | 11/1972 | Eburn | 101/415.1 |
| 3,786,749 | 1/1974 | Singh | 101/247 |
| 3,893,394 | 7/1975 | Fusco et al. | 101/415.1 |

FOREIGN PATENT DOCUMENTS

288,446  7/1970  Austria ............................ 101/128.1

*Primary Examiner*—Edgar S. Burr
*Assistant Examiner*—R. E. Suter
*Attorney, Agent, or Firm*—M. Ted Raptes

[57] ABSTRACT

This invention relates to a device for releasably mounting thin walled cylindrical members in a machine involving rotary working operations, such as rotary screens used in rotary printing presses. The device comprises cylindrical end members adapted to be mounted on the rotary machine and adapted to fit within and engage inner peripheral flanges at the ends of the cylinder. The end members comprise an annular slot which contains a ring member expandible by suitable pressure means. Each ring member contains an outer annular groove adapted to engage the inner flange at each end of the cylinder upon expansion of the ring member thereby securing the ends of the cylinder on each end member. The ring member can be a steel band expandable by the action of a pressurized air tube mounted in the annular slot, or alternatively, the ring member can be an outer wedge ring disposed in the annular slot with an inner wedge ring in the slot which can be axially moved and thus radially moving the outer wedge ring. With the cylinder mounted between the end members, it is capable of being stretched in an axial direction.

6 Claims, 4 Drawing Figures

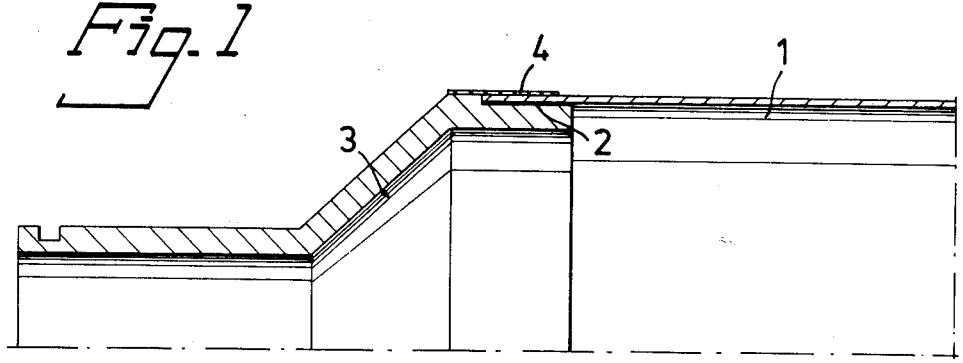
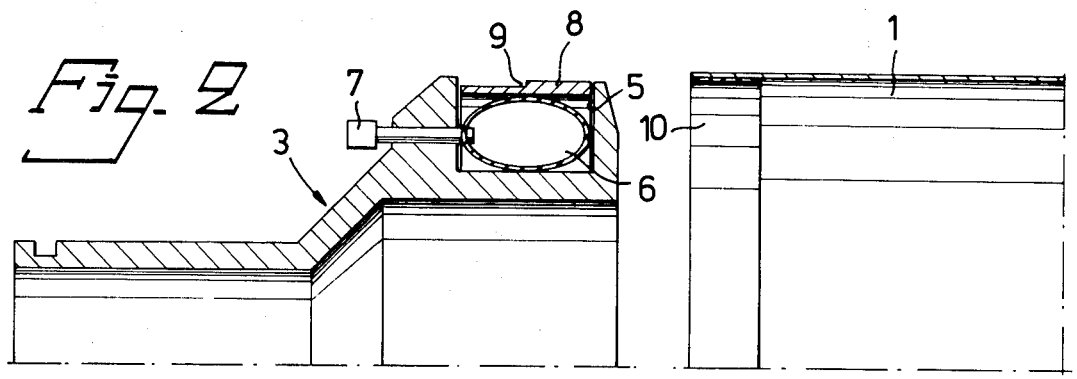
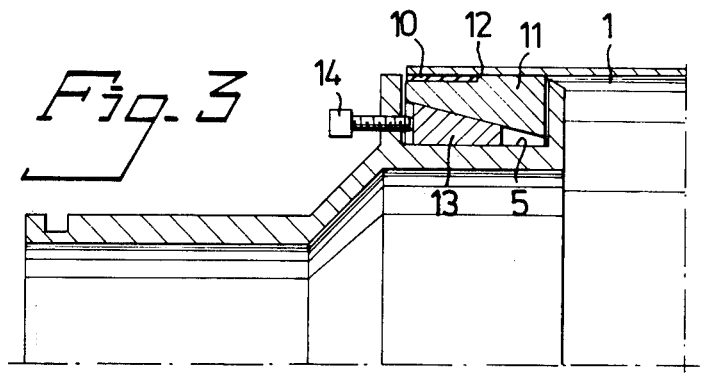
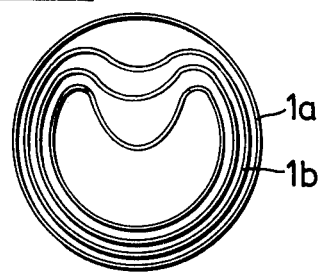

ROTARY SCREEN MOUNTING DEVICE

BACKGROUND OF THE INVENTION

The present invention relates to a device for mounting thin cylindrical objects, which after having been mounted are adapted to be used for any kind of rotary working operation.

The invention can be used in several different fields, but for the sake of simplicity the invention will be described with the mounting of rotary screen for rotary screens printing operations.

Rotary screens conventionally used in rotary screen printing operations comprise a thin cylinder of nickel or any other suitable metal which is prepared by electroplating and if necessary etching. The cylinder carries the design for the image to be printed in the form of a screen having various size holes. The cylinder thus provided has a thickness of about a millimeter and it may often have a length of more than 2 meters. Due to the relative thinness of the material and the length in comparison to its diameter, it has to be stretched or tensioned relatively strongly in the axial direction in order that the cylinder will not collapse during the printing operation or yield at the central parts thereof whereby printing is not possible. For this purpose, the cylinder or the rotary screen is provided with mounting ends at the opposite ends thereof, and the axial stretching is provided by an axial movement of the said mounting ends.

For technical reasons during printing operations, the rotary screen must have a completely smooth outer surface without any projecting parts, and the mounting of the rotary screen on the mounting ends should be accomplished in a manner such that the screen is retained by internal rather than external mounting means.

A known method of mounting a rotary screen on mounting ends or means comprises providing the mounting ends with a cylindrical rim of substantially the same thickness as the rotary screen and having the same outer circumference as the inner circumference of the rotary screen. The rotary screen is mounted over the rims of the mounting ends and secured by suitable means such as any suitable glue. If desired, a thin strip of tape may be applied round the outer joint between the screen and the rim of the mounting ends. The rotary screen so mounted is then installed and secured in the printing machine and a relatively strong tensioning or stretching is applied in the axial direction so that the rotary screen is kept stretched in its cylindrical form, whereby printing may be conducted.

The said known method gives good results, but the method has some disadvantages. The disadvantages are particularly related to the fact that the rotary screen has to be saved after the printing operation in order to be used again for printing operations. This avoids the expensive and time consuming operation of providing and mounting of one or more new rotary screens for each print pattern. The glued connection between the mounting ends and the rotary screen must be very strong in order to make possible the strong stretching between the mounting ends without pulling the glued joints apart. Since the glued mounting ends cannot be released from the rotary screen after the printing, the storing of the rotary screens requires large storage room. Furthermore, for each rotary screen, two mounting ends are required.

It has therefore been a disideratum of the industry for a method of releasably mounting rotary screens on mounting ends, whereby the necessary storage space for the rotary screens could be reduced and at the same time the method would provide the reusing of the mounting ends for other rotary screens.

An essential problem in the attempts of eliminating the disadvantages in the said known method is that the mounting ends ought to be as light in weight as possible since there is otherwise a risk that the rotary screen would collapse or at worst be broken when the rotary screen mounted on the mounting ends is lifted for installation in the printing machine. The thin rotary screen cylinder is very easily damaged and the lifting thereof is only practical at the mounting ends. Every tendency for increase of weight of the mounting ends therefore increases the risk of breaking the rotary screen when lifting the screen together with its mounting ends.

SUMMARY OF THE INVENTION

Basis of the present invention, therefore, is to provide a device by means of which thin cylindrical objects like rotary screens, may be releasably mounted in mounting ends or means for subsequent installation in a machine, e.g., a printing machine, and which is designed to allow a storage of the cylindrical objects under reduced space requirements for any subsequent re-use. The invention provides means for releasing the cylindrical objects from and re-use of the mounting ends. The device is light in weight so that there is no risk that the rotary screen can be damaged when being lifted or otherwise handled.

Further advantages of the invention will be apparent from the following specification, drawings and the appended claims.

DESCRIPTION OF THE DRAWINGS

FIG. 1 is a fragmentary cross-section of a rotary screen and mounting ends of the prior art as described heretofore;

FIG. 2 is a fragmentary cross-section of an embodiment of a device according to this invention for mounting of a rotary screen on mounting ends;

FIG. 3 shows a fragmentary cross-section of an alternative embodiment of the invention, and;

FIG. 4 discloses a method for storing rotary screens without mounting ends in a small storage space.

DETAILED DESCRIPTION OF THE INVENTION

As previously mentioned, rotary screens are generally manufactured by the electroplating of nickel, whereby a thin cylinder of nickel is obtained and the image carrying parts are formed by a screen of various sized holes. Printing ink is applied within the cylinder and is forced out through the holes thereof. The cylinder or the rotary screen has very little rigidity and in order to make it rigid and to be able to provide a supply of ink to the interior thereof, it must be provided with mounting ends or means with which it may be stretched and installed in a printing machine.

According to the conventional device illustrated in FIG. 1, the rotary screen 1 is glued onto a correspondingly wide groove 2 at each mounting end 3. Preferably some kind of plastic glue is used having good stretch strength characteristics and being of a type so as not to be dissolved by liquids or solutions for the ink which are kept within the interior of the rotary screen during printing. A thin strip of tape 4 may be applied round the joint between the printing screen and the mounting end. The strip of tape 4 ought to be thin so as not to increase the total periphery of the rotary screen, since this can interfere with the printing operation.

For technical reasons during printing operations, both the rotary screen and the mounting ends must have outer surfaces which are smooth and not have any outwardly projecting parts. For this reason, a mounting of the rotary screen in the mounting ends is not desirable by mounting devices applied to the outer surfaces. Since the rotary screen has its ends stretched in a printing machine with a stretching force of 40-50 kg or more, it is important that a strong joint be provided in the axial direction between the rotary screen and the mounting ends.

In the embodiment of this invention illustrated in FIG. 2, the rotary screen and the mounting ends are formed with releasable mounting means, so that the rotary screens after printing is completed can be removed from the mounting ends and be stored in a small storage space. For this purpose, each mounting end is formed with an annular slot 5, in which a radially expansible means in the form of an air tube 6 is mounted. The air tube 6 is formed with an air nipple 7 extending through a radial end wall and including an air valve (not shown). At the outer side of the air tube 6, an expansible steel band 8 is provided having an annular groove 9 on its outer surface. The depth and the axial length of the said groove 9 may be adapted according to circumstances, but normally the said slot need not be deeper than about a millimeter at maximum and need not have an axial length greater than 5-15 millimeters. The steel band 8 is expansible to such an extent that it may expand and contract an amount at least corresponding to the depth of the groove. The depth and axial length of the slot 5 is adequate to contain the dimensions of the steel band 8 therein.

The screen 1 is provided at each end with an inner annular flange 10 of substantially the same axial length and depth the groove 9 and is adapted to coact therewith. The flange 10 can be any suitable material which has the strength and rigidity to retain the screen in a stretched cylindrical form when tensioning and stretching thereof is applied in the axial direction. A strip of suitable tape which is attached adjacent the edge of the rotary screen at the inside surface thereof has been found sufficient.

When mounting the rotary screen 1, the air tube 6 is kept without pressure, and the steel band 8 is thereby maintained contracted. The rotary screen 1 is mounted over the circumferential edge of the mounting end 3 so that the flange 10 is positioned in line with the groove 9. The air tube 6 is inflated by pumping air into the air nipple 7, whereby the steel band 8 is expanded and a locking is provided between the groove 9, steel band 8 and the flange 10 of the rotary screen 1. A suitable pressure in the air tube 6 required to provide a good locking of the rotary screen to the mounting end should be at least 0.5 kg/cm² above atmospheric pressure, the said pressure depending on the thickness of the rotary screen.

In the embodiment of the invention shown in FIG. 3, the air tube 6 is replaced in slot 5 by a mechanical locking means comprising a radially expansible wedge ring 11 having a flange groove 12 and a solid wedge ring 13. A number of screws 14 are adapted to be turned to force wedge ring 13 against the outer expansible wedge ring 11 so as to force it to expand. In so doing, flange 10 is locked in groove 12.

The expansible wedging means 11 provided in the mounting end can have various modifications, e.g., in the form of a double walled cylinder having a mass enclosed between the walls thereof which on compression by the movement of wedge ring 13 against the inner wall provides an expansion of the outer wall of the cylinder and thereby a locking of the rotary screen 1.

One feature and advantage derived from the invention is that the storing of rotary screens may take place with substantially less storage space than has previously been possible, because the mounting ends can be released from the rotary screens after the printing operation. By pressing an axial part of the rotary screen towards the center thereof the screens may be formed with a kidney-like shape in cross-section as shown in FIG. 4. Thereby, the screen 1b, thus formed, may easily be pushed into another normal screen 1a, and thereafter additional screens may be pushed into each other in the corresponding way as shown. It has been fully possible and suitable to push and store at least 10 rotary screens into each other as described, and the need for storage space can in this way be reduced to less than one tenth of the previously necessary.

In case it is desired to print with a stored rotary screen, it may easily be taken out of the stored roll of screens by introducing a rod between two rotary screens and reducing the average outer diameter of the inner screen by forcing the concave part further in so that the intended screen may be taken out.

It is to be understood that the above specification is only of examplifying nature and that various modifications are intended to be covered within the scope of the appended claims.

I claim:

1. A device for releasably mounting a thin walled cylindrical member in a rotary machine, whereby said cylindrical member can be installed and maintained in an axially stretched condition and used in rotary working operations, comprising a pair of cylindrical mounting members disposed in spaced axial alignment in said rotary machine, each of said mounting members comprising an annular outer peripheral slot, a radially outwardly expansible ring member containing an annular outer peripheral groove disposed in said slot within the outer periphery of each said mounting member, annular expansion means disposed in said slot for outwardly expanding said ring member, said thin walled member comprising a peripheral flange disposed on the inner annular surface of each end thereof, said peripheral flange of said thin walled member engaging said groove of said ring member and being retained therein upon expansion of said ring member, whereby when both of said flanges are engaged and retained in said respective groove members, said thin walled member can be axially stretched and maintained in an axially stretched condition for use in rotary working operations.

2. The device of claim 1 wherein said expansion means comprises fluid pressure means for radially expanding said ring member.

3. The device of claim 2 wherein said pressure means comprises an air tube which can be pressurized and inflated.

4. The device of claim 3 wherein said air tube is actuated by nipple disposed through a radially extending portion of said mounting member.

5. The device of claim 1 wherein said ring member has an inner wedged surface and said expansion means comprises an inner wedge means movable against said wedged surface of said ring means for radially expanding said ring means.

6. The device of claim 5 wherein said inner wedge means is actuated by screw means disposed through a radial portion of said mounting member.

* * * * *